UNITED STATES PATENT OFFICE.

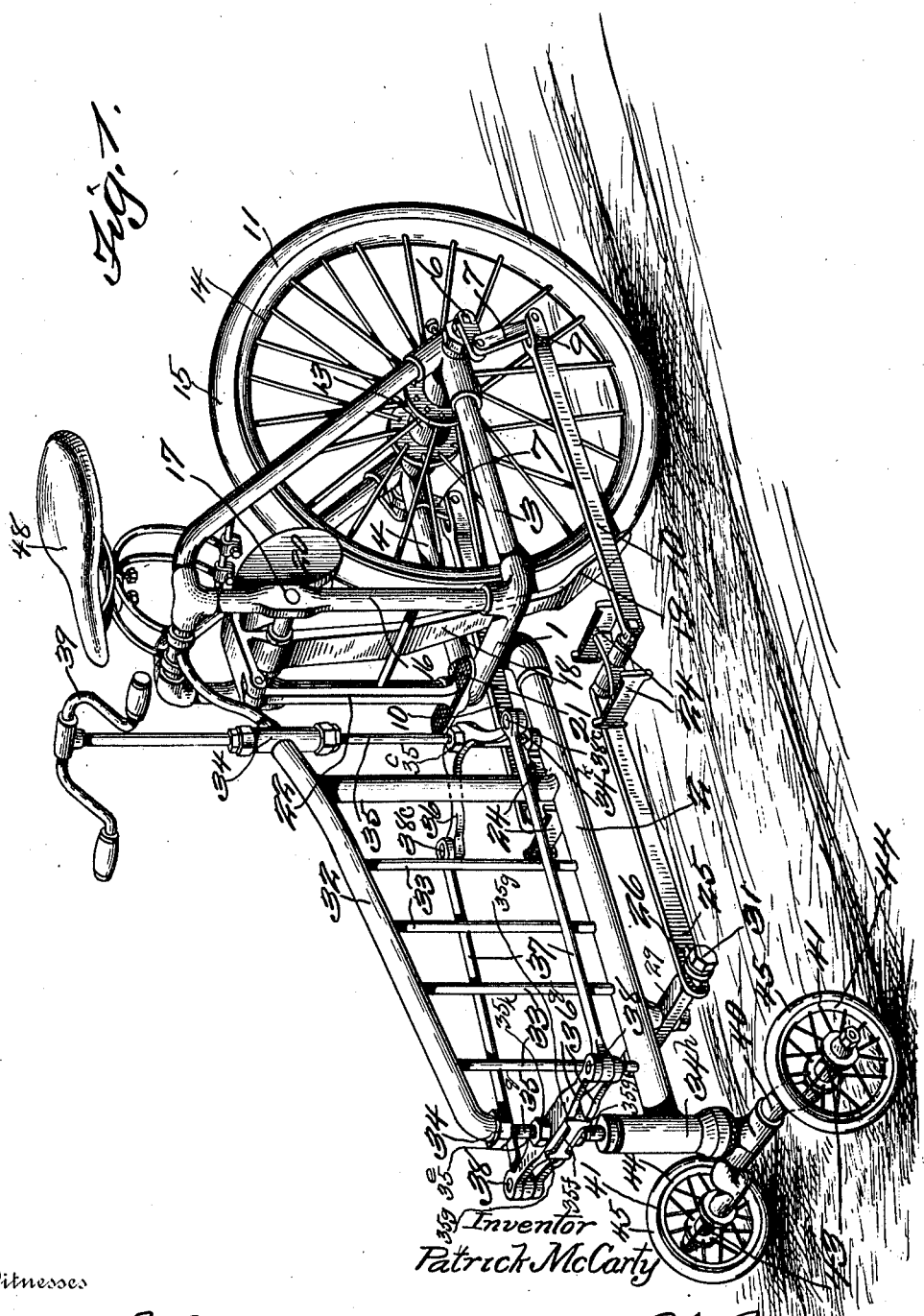

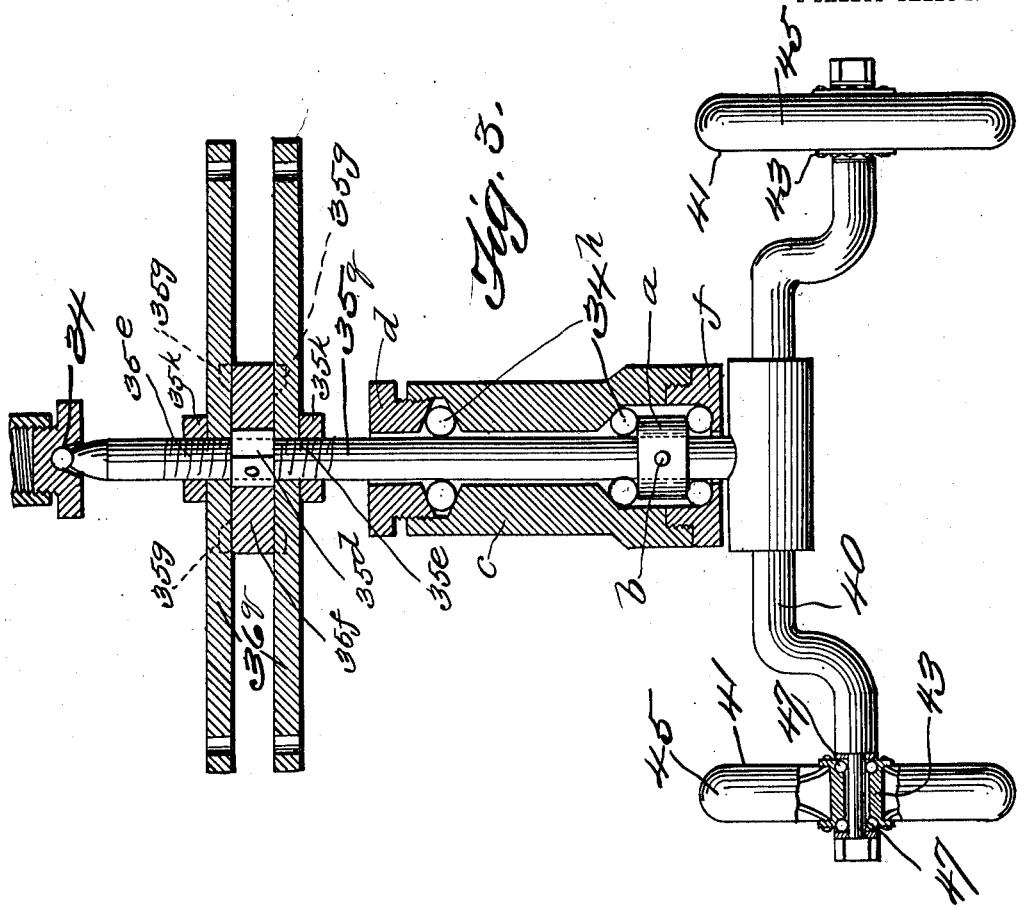
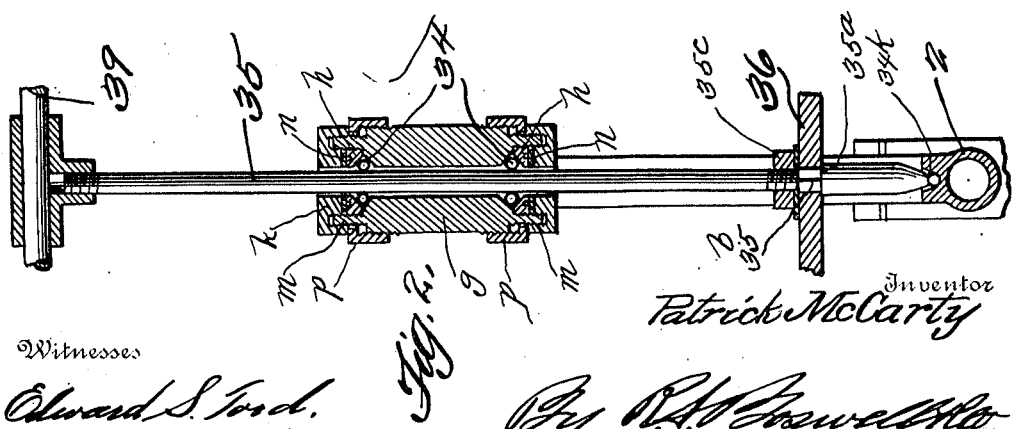

PATRICK McCARTY, OF HONESDALE, PENNSYLVANIA.

TRICYCLE.

1,031,280.

Specification of Letters Patent.

Patented July 2, 1912.

Application filed August 13, 1910. Serial No. 577,001.

*To all whom it may concern:*

Be it known that I, PATRICK MCCARTY, a citizen of the United States of America, residing at Honesdale, Wayne county, State of Pennsylvania, have invented a new and useful Tricycle, of which the following is a specification.

This invention relates to a new and useful tricycle.

The main feature of the invention is the provision of a novel steering mechanism, comprising pairs of horizontally arranged oscillating bars, connected in order to act in unison and connected with the front axle of the machine, so that the tricycle may be readily steered by the handle bars. The vertically arranged shafts on which the pairs of horizontally arranged oscillating bars are journaled are mounted in bearings on the elongated portion of the frame of the machine. The bars of each pair of the horizontally arranged oscillating bars are connected so that they will move as one body.

In the drawings:—Figure 1 is a perspective view of a tricycle embodying the various features of the invention. Fig. 2 is a sectional view taken through the handle bars and a pair of the horizontally arranged oscillating bars in order to show the detail structure. Fig. 3 is a detail sectional view through the front bearing for the shaft 35ª, showing the bars 36ª.

As to the accompanying illustrations, 1 denotes the frame of the tricycle or machine which comprises, at its forward portion, an elongated beam 2 which terminates at the rear of the machine in a forked portion consisting of the side bars 3 and 4. Journaled in bearings of the side bars 3 and 4 is a crank shaft or axle 6 and connected to the cranks of which are the links or pitman rods 7. Pivotally connected to the lower extremities of the links or pitman rods are the bifurcated ends 9 of the operating pedal bars 10. Journaled upon and designed to rotate with the crank shaft or axle is the driving wheel 11 which comprises the usual hub portion 13 and the rim 14, surrounding which is the usual form of pneumatic tire 15. In appearance and construction this driving wheel is similar to bicycle wheels. The side bars 3 and 4 at the point where they merge into the elongated forward lower bar 2 are provided with upwardly extending portions 16 in which bearings 17 are provided for the pivots of the gravitation brake.

This brake consists of a downwardly extending brake shoe bar 18 which is provided with the usual form of shoe 19 designed to coöperate with the driving wheel when the brake is applied in order to brake the machine. The brake is so weighted as shown at 20 that, when pressure is relieved upon the pivot bar of the brake, the same will return to its normal position and out of contact with the driving wheel. In order to apply the brake, the operator of the machine may apply foot pressure upon the right angled portion 21 of the pivot bar 22.

The pedal bars are provided with broad pedals 24 in order that the operator may stand upon the same and by pressing first on one and then on the other cause the machine to be propelled forward through the cranking mechanism. The forward ends 25 of the pedal bars are provided with elongated slots 26 to receive the ends of the bearing bar 29. To hold the ends of the pedal bars upon the journals of the bearing bar, nuts 31 are threaded to the bearing bar at each end thereof.

Arranged above the forward elongated bar of the frame is an additional bar 32, which is arranged approximately parallel with the lower bar 2 and between the bar 32 and the bar 2 connections 33 are formed, which are brazed to the bar 2 and the bar 32. Journaled in bearings 34, 34$^k$, and 34$^h$ of the bars 2 and 32 are vertically arranged shafts 35 and 35$^a$. On the shaft 35$^a$ is a pair of horizontally arranged oscillating bars or beams 36$^a$, while on the shaft 35 is a single bar 36. The bars 36$^a$ are properly spaced apart to receive the connecting pitman rods 37, which are connected to the beams by means of suitable bolts or other means 38. The rear ends of the rods 37 are connected to the outer ends of the single bar 36, as at 38$^c$. The rear shaft 35 is provided with the shoulder 35$^a$, and adjoining the shoulder is a rectangular portion 35$^b$, on which is fitted the rear bar 36. Threaded on the rear shaft 35 is a nut 35$^c$, which holds the rear bar 36 against the shoulder. The forward shaft 35$^a$ is provided with a rectangular portion 35$^d$, and above and below this portion, the shaft 35$^a$ is threaded, as shown at 35$^e$. Fitted on the rectangular portion 35$^d$ is a member 35$^f$, which is provided with upper and lower lugs 35$^g$ at each end, between which the forward bars 36$^a$ are arranged. These lugs constitute means together with the rectangular portion 35ᵈ, to cause the forward bars 36ᵃ to rock with the forward shaft 35ᵃ. Nuts 35ᵏ are threaded on the shaft 35ᵃ, to hold the forward bars 36ᵃ in position between the lugs. The shaft 35ᵃ near its base portion is provided with a collar $a$, which is secured to the shaft by the pin $b$. The shaft 35ᵃ extends through the casing $c$, in the upper and lower portions of which the ball bearings 34ʰ are arranged. These ball bearings are held in place by the plugs $d$ and $f$, which are threaded in the casing $e$. By this arrangement, it will be seen that vertical movement of the shaft 35ᵃ is prevented, yet the same is permitted to freely turn. The shaft 35ᵃ extends from an enlargement of the axle shaft 40. The shaft 35 extends through a casing $g$, in which the ball bearings 34 are mounted, in the top and the bottom thereof. Collars $h$, one secured in each end of the casing $g$, to hold the balls in place, are provided. Arranged between the collars $h$ and the lock nuts $k$, which are threaded to the flanges $m$, are packing rings $n$. The lock nuts $k$ are for the purpose of locking the nuts $p$ in place, as will be seen clearly in Fig. 2. It will be clearly noted that by these ball bearings and the thrust bearing of the shaft 35, the same may readily turn, and not only turn but may be raised slightly from its thrust bearing, but not sufficiently to remove the lower end of the shaft 35 completely from the socket of the thrust bearing. It has been found that these forms of ball bearing mountings are especially adaptable, desirable and essential to this form of steering mechanism, for this design of steering mechanism may not only be applied to a tricycle, but equally as well to automobiles and the like, and also to sled trucks and the like, whereby the sled truck may be guided by the party at the rear. These horizontally arranged oscillating bars 36ᵃ are fixed with regard to one another so as to move as one body when the steering mechanism is manipulated through the handle bars 39. The forward vertically arranged shaft is connected to the forward axle shaft 40 so that the two may move together and journaled upon the trunnions of the forward axle shaft are the usual wheels 41. These wheels 41 are of the same make and type as the driving wheel in the rear of the machine, comprising the usual hub 43, the rim 44 and the usual form of pneumatic tire 45. The wheels 41 are provided with ball bearings 47 where the wheels are journaled upon the trunnions of the front shaft or axle.

Arranged above the driving wheel is a seat 48 similar to the ordinary bicycle seat.

The operator of this machine is supposed to stand when manipulating the pedal bars, but he may, in coasting, use the seat and rest his feet upon the frame of the machine.

The entire frame of the machine is designed to be made of drawn tubular material and all joints of the frame are designed to be brazed as is usually the case in the construction of bicycle frames and similar devices.

The invention having been set forth, what is claimed as new and useful is:—

1. In a steering mechanism for a tricycle, a frame comprising upper and lower substantially horizontally arranged bars, a shaft mounted in bearings of the forward portions of the bars, the shaft having a rectangular portion, a member arranged on the rectangular portion and provided with lugs on each side projecting upwardly and downwardly, a pair of oscillating bars one arranged above and the other below the rectangular portion and between the lugs of the member, and means for holding the oscillating bars in such positions, the shaft being mounted in a casing including ball bearings, and a front axle including front wheels secured to the shaft.

2. In a steering mechanism, a front steering post, a frame including a casing through which the front steering post extends, the steering post having a collar detachably secured near its lower end, ball bearings arranged above and below the collar and in the casing, a cap for holding the ball bearings in place, ball bearings in the upper portion of the casing, a second cap connected to the casing for holding the second-named ball bearings in place, the frame including an upper bar, the post having a thrust bearing in the upper bar, and means for turning the front post.

3. In a tricycle including a driving mechanism, a frame having upper and lower substantially horizontally arranged tubular bars provided with vertically arranged rods connecting them, a rocking rod having handle bars mounted in a bearing of the upper tubular bar and provided with a thrust bearing in the lower tubular bar, said rocking rod having a shoulder and provided with a rectangular portion adjoining the shoulder, a transverse bar fitted on the rectangular portion and against the shoulder, means threaded on the rocking rod to clamp the transverse bar against the shoulder, a forward rocking rod having steering wheels and mounted in bearings of the upper and lower tubular bars, transverse bars movable with the forward rocking rod, and rod connections between the forward and rear transverse bars.

4. In a tricycle including a driving mechanism, a frame having upper and lower substantially horizontally arranged tubular bars provided with vertically arranged rods connecting them, a rocking rod having handle bars mounted in a bearing of the upper tubular bar and provided with a thrust bearing in the lower tubular bar, a transverse bar movable with the rocking rod, a forward rocking rod having steering wheels mounted in bearings of the upper and lower tubular bars, the forward rocking rod having a rectangular portion, transverse bars threaded to the forward rocking rod, one above and below the rectangular portion, a member fitted to the rectangular portion between the forward transverse bars and provided with means to engage the forward transverse bars to cause them to move with the forward rocking rod, means threaded on the forward rocking rod above and below the forward transverse bars for holding them against the member and the said means of the member, and rod connections between the forward and rear transverse bars.

In witness whereof, the applicant's signature, is hereunto affixed in the presence of witnesses.

PATRICK McCARTY.

Witnesses:
WILLIAM H. HAM,
THOS. Y. BOYD,
GEO. J. MUELLER.